(12) United States Patent
Maltsev et al.

(10) Patent No.: US 8,155,015 B2
(45) Date of Patent: Apr. 10, 2012

(54) GEOGRAPHICAL SCHEDULING AND ASSOCIATION PROCEDURE FOR WIMAX SYSTEMS

(75) Inventors: Alexander Maltsev, Nizhny Novgorod (RU); Jaroslaw J. Sydir, San Jose, CA (US); Andrey Pudeyev, Nizhny Novgorod (RU); Alexander Maltsev, Jr., Nizhny Novgorod (RU)

(73) Assignee: Intel Corporation, Santa Clar, CA (US)

( * ) Notice: Subject to any disclaimer, the term of this patent is extended or adjusted under 35 U.S.C. 154(b) by 1016 days.

(21) Appl. No.: 12/079,920

(22) Filed: Mar. 28, 2008

(65) Prior Publication Data

US 2009/0245160 A1 Oct. 1, 2009

(51) Int. Cl.
*H04L 12/26* (2006.01)
*H04B 3/36* (2006.01)
*H04B 7/14* (2006.01)
*H04J 1/10* (2006.01)
*H04J 3/08* (2006.01)

(52) U.S. Cl. ........ 370/252; 370/293; 370/315; 370/492; 370/501

(58) Field of Classification Search .................. 370/252, 370/279, 293, 310, 315, 316, 492, 501
See application file for complete search history.

(56) References Cited

U.S. PATENT DOCUMENTS

| | | | | |
|---|---|---|---|---|
| 6,005,884 A | * | 12/1999 | Cook et al. | 375/132 |
| 6,353,729 B1 | * | 3/2002 | Bassirat | 455/11.1 |
| 6,374,109 B1 | * | 4/2002 | Shaheen et al. | 455/434 |
| 7,586,873 B2 | * | 9/2009 | Heath et al. | 370/329 |
| 7,756,482 B2 | * | 7/2010 | Lin et al. | 455/67.13 |
| 2004/0184398 A1 | * | 9/2004 | Walton et al. | 370/203 |
| 2007/0211757 A1 | * | 9/2007 | Oyman | 370/468 |
| 2008/0130481 A1 | * | 6/2008 | Fujii et al. | 370/203 |
| 2008/0151849 A1 | * | 6/2008 | Utsunomiya et al. | 370/338 |
| 2008/0240054 A1 | * | 10/2008 | Sandhu et al. | 370/338 |
| 2009/0225706 A1 | * | 9/2009 | Ramachandran et al. | 370/329 |
| 2009/0303918 A1 | * | 12/2009 | Ma et al. | 370/329 |
| 2010/0111027 A1 | * | 5/2010 | Hart | 370/329 |
| 2010/0278123 A1 | * | 11/2010 | Fong et al. | 370/329 |
| 2010/0318861 A1 | * | 12/2010 | Gesbert et al. | 714/704 |

* cited by examiner

*Primary Examiner* — Warner Wong
(74) *Attorney, Agent, or Firm* — Caven & Aghevli LLC

(57) ABSTRACT

Techniques to manage communication between a subscriber station and a base station or a relay station are disclosed.

12 Claims, 3 Drawing Sheets

GEOGRAPHICAL SCHEDULING AND ASSOCIATION PROCEDURE FOR WIMAX SYSTEMS

RELATED APPLICATIONS

None.

BACKGROUND

In modern wireless communications systems based on orthogonal frequency multiple access technology (OFDMA), interference from sources from other cells can be a major performance limiting factor, particularly for the users located at the cell edges. Techniques to manage interference would find utility.

BRIEF DESCRIPTION OF THE DRAWINGS

The detailed description is described with reference to the accompanying figures, in which.

DETAILED DESCRIPTION

Described herein are exemplary systems and methods for implementing a geographical scheduling and association procedure in a communication network such as, e.g., a WiMAX network. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

In one aspect, this document describes a novel frame structure and association procedure for 802.16e, m-like systems with relay stations or, in some embodiments, for systems with some means of centralized scheduling among several base stations (BSs). In some embodiments, this document describes a deployment scenario and a frame structure for the efficient time-frequency resource usage and interference avoidance.

Figure 1:
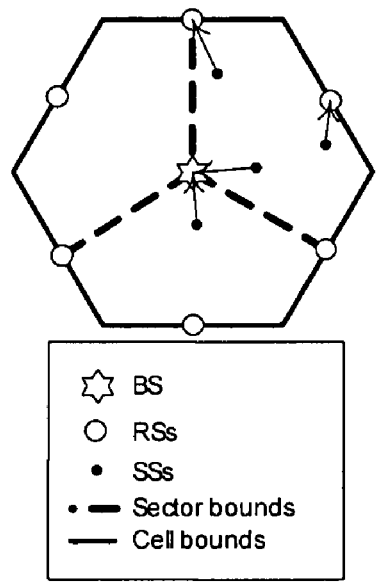
FIG. 1 is a schematic illustration of a communication network deployment, according to some embodiments.

FIG. 1 is a schematic illustration of a communication network deployment, according to some embodiments. Referring to FIG. 1, a typical cell in a cellular network (802.16e, and its enhancement, 16m, for example), with central base station (BS), several relay stations (RS) associated with the BS and subscriber stations associated with the BS or one of the RSs. Subscriber stations (SSs), also referred to as Mobile Stations (MSs) in some circumstances, may associate directly with central BS or with any of the relay stations (RS), based on the quality of the link with each of these stations. The link between the SS and BS is referred to herein as the BS-SS link and to the link between the SS and RS is referred to herein as the RS-SS link.

A variety of different resource sharing schemes (time/frequency reuse) can be implemented for BS-SS and RS-SS links. Two examples include time/frequency multiplexing (i.e., division) and simultaneous transmissions. In time/frequency-division transport, transmissions on the BS-SS and RS-SS links are allocated separate resources in time and frequency. None of the transmissions overlap in time or frequency. By contrast, in simultaneous transmissions, transmissions on the RS-SS and BS-SS links are performed simultaneously (e.g., utilizing overlapping time/frequency resources). In the case of multiple relays in a BS sector area, more complex resource sharing schemes may be used, employing simultaneous transmission on some links and time-frequency division on others.

The time/frequency-division case offers a low-interference environment, but at the cost of increased resource usage. By contrast, simultaneous transmissions increase the interference level, but time/frequency resources are used more efficiently.

In situations in which a subscriber station (SS) is located near the BS (or RS) the SS typically has a good signal-to-noise ratio and is significantly less susceptible to interference effects due to relatively far distances to the interference sources (other BSs in downlink mode and SSs in UL mode). On the other hand, SSs located at the cell edges are have significantly larger interference level, since they are almost equally distanced from the home and interfering BSs (or RSs).

Figure 2:
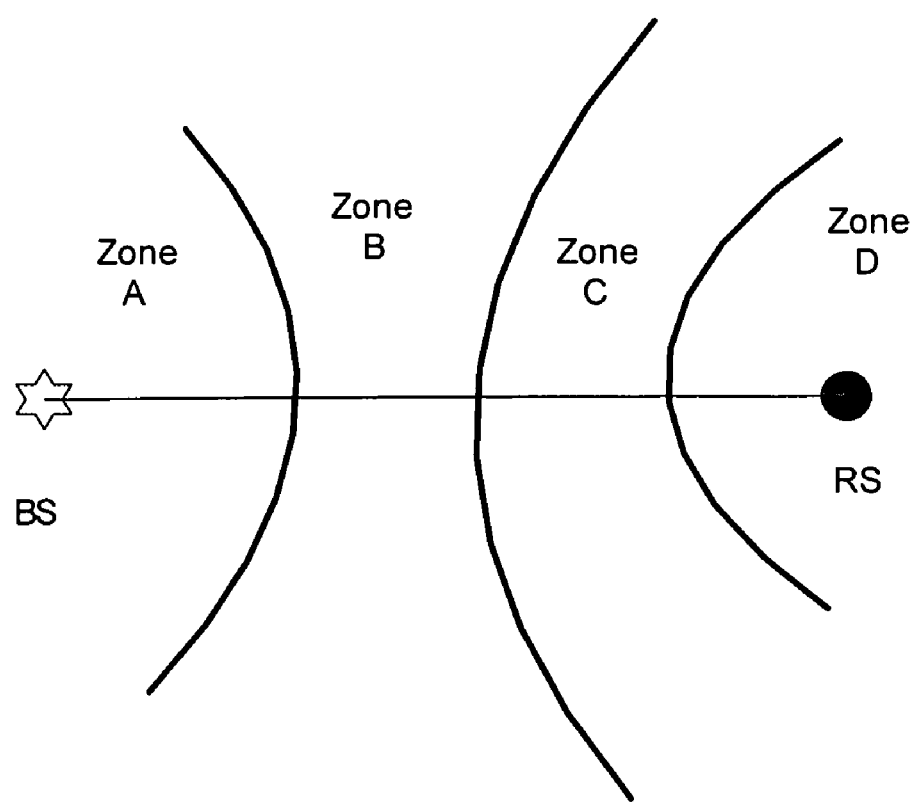
FIG. 2 is a schematic illustration of zones in a communication network, according to some embodiments.

Thus, in some embodiments, SSs may be divided into the following four groups, or, geographically, four zones (see FIG. 2): In the first zone (Zone A), SS that associated with the BS: high signal strength, low interference. In the second zone (Zone B), the SS that associated with the BS: low signal strength, high interference. In the third zone (Zone C), the SS that associated with the RS: low signal strength, high interference. In the fourth zone (Zone D), the SS that associated with the RS: high signal strength, low interference. Generally, zones A and D may be called low mutual interference zones, and B, C may be called high mutual Interference zones.

Figure 3:
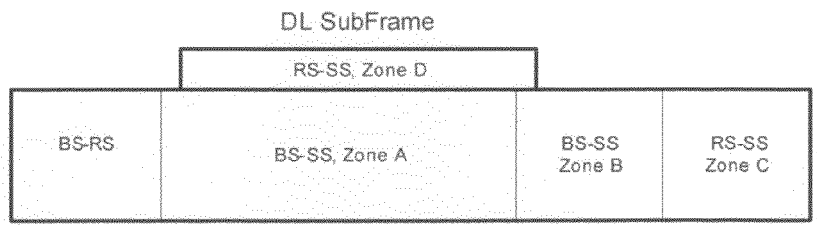
FIGS. 3-4 are schematic illustrations of downlink and uplink sub-frames structures, according to some embodiments.
Figure 4:
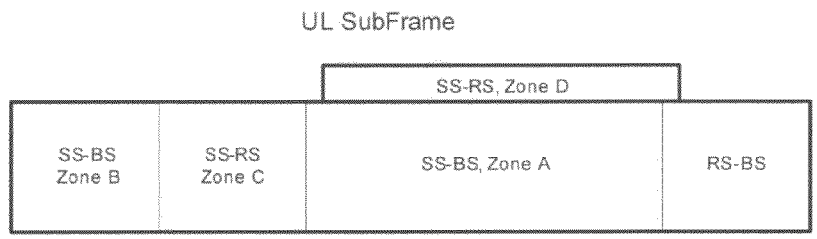

To improve usage of time-frequency resources, each geographical zone may be assigned to a specific zone in the transmission frame within which the resource sharing scheme (simultaneous transmission or time/frequency division) can be used. FIGS. 3-4 are schematic illustrations of downlink and uplink sub-frame structures, according to some embodiments Referring to FIGS. 3-4, subscriber stations near the center BS (i.e., Zone A) may work at the same time and frequency (i.e., in simultaneous transmission mode) with users near the RS (i.e., Zone D). By contrast, subscriber stations from Zones B and C should use time/frequency division mode to decrease the interference impact.

In some embodiments, the division between High Mutual Interference zones (B,C) and the Low Mutual Interference zones (A,D) may be time division or frequency division, as well. FIGS. 3 and 4 show only time division case, as the example. The division between the Low Mutual Interference (A, D) and High Mutual Interference (B,C) zones can be static or dynamic. The partition between the zones can be created and maintained across multiple frames, or it can be created by the scheduler on a frame-by-frame basis.

Figure 5:
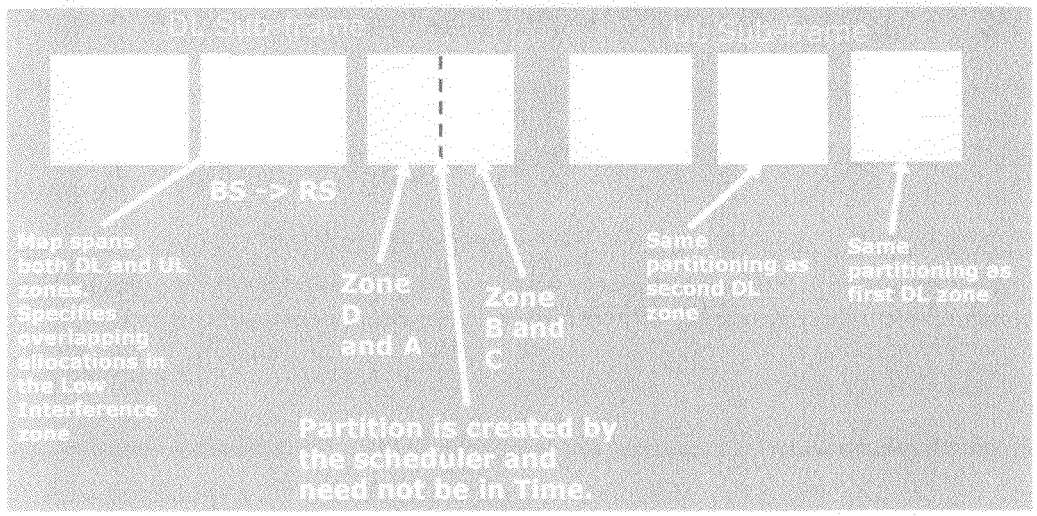
FIG. 5 is a schematic illustration of frame structures, according to some embodiments.

FIG. 5 shows another example of exploiting the proposed principle within the frame structure being proposed for the future 802.16m standard. After the legacy 16e zones, goes the BS-RS zone, which also contain allocations information. The next part of the frame contains the simultaneous transmission and division zones. The UL subframe has the same structure.

Figure 6:
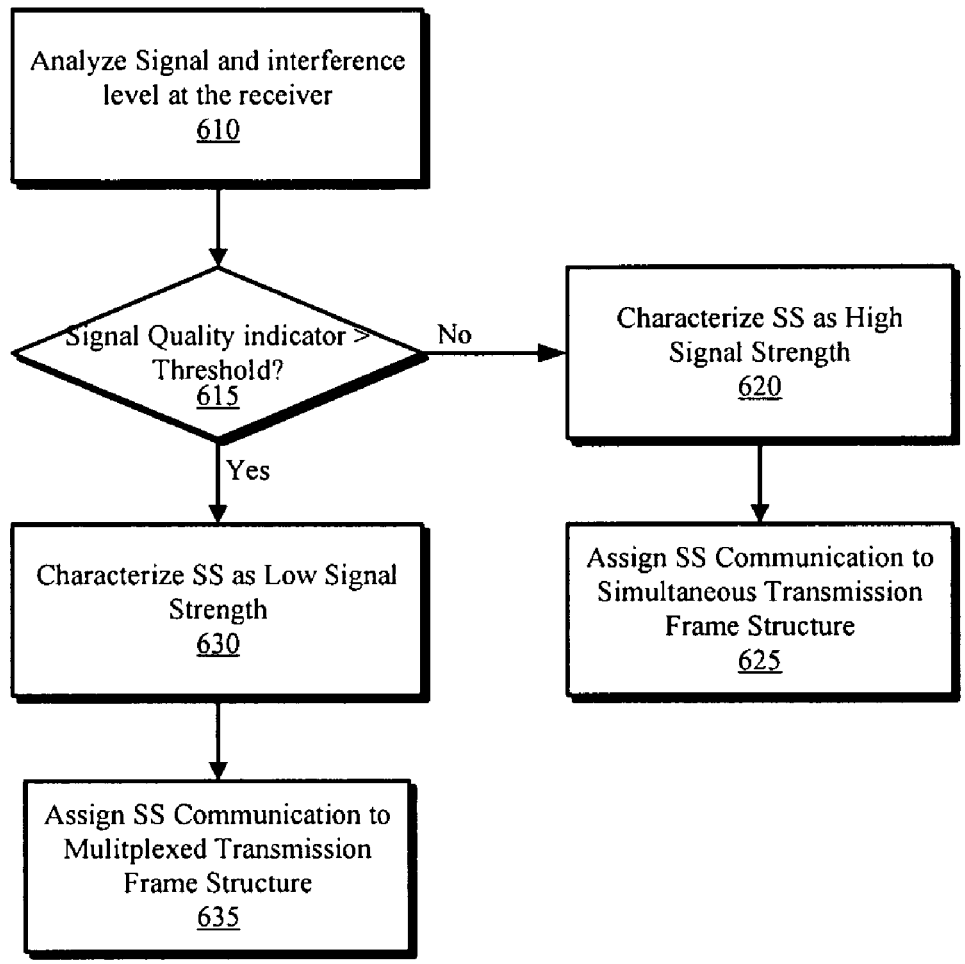
FIG. 6 is a flowchart illustrating operations in a method to implement a geographical scheduling and association procedure for WiMAX system, according to embodiments.

FIG. 6 is a flowchart illustrating operations in a method to implement a geographical scheduling and association procedure for WiMAX system, according to embodiments. In some embodiments, the operations depicted in FIG. 6, may be implemented as logic instructions stored in a suitable memory location and executable on a process, or as logic implemented in hardwired circuitry. Referring to FIG. 6, at operation 610 a signal received in a base station from a subscriber station (SS) is analyzed to determine into which zone the subscriber station should be categorized.

The specific algorithm by which subscribers are placed into a certain zone may be different in different embodiments. In some embodiments, a signal quality indicator (signal-to-noise ratio, in some embodiments, instantaneous capacity or mutual information in others) is compared to a threshold to determine whether the signal quality indicator exceeds a threshold value (operation 615). If, at operation 615, the signal quality indicator exceeds a threshold, then control passes to operation 5620 and the signal from the subscriber station (SS) is categorized as a high strength signal. Control then passes to operation 625 and the communication between the subscriber station and the base station is assigned to a simultaneous transmission frame structure. For example, to the zone A may be assigned only subscribers that have received signal strength indicator (RSSI) from/to the center BS is more than a predetermined value. More complex algorithms may employ interference level measurement. Note, that proposed frame format may (or may not) contain specific relay preambles/midambles.

By contrast, if at operation 615 the signal quality indicator does not exceed a threshold, then control passes to operation 530 and the signal from the subscriber station (SS) is categorized as a low strength signal. Control then passes to operation 635 and the communication between the subscriber station and the base station is assigned to a multiplexed transmission frame structure.

Thus, by using a suitable algorithm of choosing subscribers in the "high mutual interference" category (zones B,C) and "low mutual interference" category, the frame may be constructed by assigning the high mutual interference users into the time/frequency division field and low mutual interference into simultaneous transmission field. Such an approach will increase the total cell/sector throughput due to using the relay station and improving the interference environment.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to manage communications in a wireless network comprising at least one base station encompassing a first geographic region and at least one relay station encompassing a second geographic region, comprising:
   assigning a subscriber station in the wireless network into one of a plurality of zones, wherein the zones are characterized by an interference characteristic, wherein assigning a subscriber station in the wireless network into one of a plurality of zones comprises dividing the region into:
      zones which utilize time/frequency multiplexing, wherein different links between subscriber stations and at least one base station or relay station operate using separate time-frequency resources; and
      zones which utilize time-frequency resource reuse, wherein two or more links between subscriber stations and base station or relay stations operate simultaneously utilizing the same time-frequency resource; and
   encoding communication packets between the subscriber station and at least one of the base station or the relay station into a frame structure segment that is transmitted according to one of a time/frequency multiplexed protocol or a resource sharing protocol as a function of the one of the plurality of zones.

2. The method of claim 1, wherein assigning a subscriber station in the wireless network into one of a plurality of zones based on its geographical position, signal strength and interference environment.

3. The method of claim 1, wherein assigning a subscriber station in the wireless network into one of a plurality of zones comprises determining whether a received signal quality indicator exceed threshold.

4. The method of claim 1, wherein assigning a subscriber station in the wireless network into one of a plurality of zones comprises determining whether an interference parameter from the subscriber station exceeds a threshold.

5. The method of claim 1, wherein managing a frame structure of wireless communication between a subscriber station and at least one of a base station or a relay station according to a protocol specific to the plurality of zones comprises assigning communication with a subscriber station categorized as exhibiting high signal strength and low interference into a simultaneous transmission zone of the frame structure.

6. The method of claim 1, wherein managing a frame structure of wireless communication between a subscriber station and at least one of a base station or a relay station according to a protocol specific to the plurality of zones comprises assigning communication with a subscriber station categorized as exhibiting low signal strength and high interference into a zone of the frame structure that is multiplexed by at least one of a time dimension or a frequency dimension.

7. A system to manage communications in a wireless network encompassing a geographic region, comprising:
   a receiver to receive a communication signal from a subscriber station;
   a signal analysis module to assigning a subscriber station in the geographic region into one of a plurality of zones including:
      zones which utilize time/frequency multiplexing, wherein different links between subscriber stations and at least one base station or relay station operate using separate time-frequency resource; and
      zones which utilize time/frequency resource reuse, wherein two or more links between subscriber stations and base station or relay stations operate simultaneously utilizing the same time-frequency resource; and
   a signal framing module comprising logic to encode communication packets between the subscriber station and at least one of a base station or a relay station into a frame structure segment that is transmitted according to one of a time/frequency multiplexed protocol or a resource sharing protocol as a function of the one of the plurality of zones.

8. The system of claim 7, wherein the signal analysis module further comprises logic to determine whether a received signal quality indicator exceed threshold.

9. The system of claim 7, wherein the signal analysis module further comprises logic to determine whether an interference parameter from the subscriber station exceeds a threshold.

10. The system of claim 7, wherein the signal framing module comprises logic to manage a frame structure of wireless communication between a subscriber station and at least one of a base station or a relay station according to a protocol specific to the plurality of zones comprises assigning communication with a subscriber station categorized as exhibiting high signal strength and low interference into a simultaneous transmission frame structure.

11. The system of claim 7, wherein the signal framing module comprises logic to manage a frame structure of wireless communication between a subscriber station and at least one of a base station or a relay station according to a protocol specific to the plurality of zones comprises assigning communication with a subscriber station categorized as exhibiting low signal strength and high interference into a frame structure multiplexed by at least one of a time dimension or a frequency dimension.

12. The system of claim 7, wherein the signal framing module comprises logic to manage a frame structure in the way to maximize the overall system spectral efficiency.

\* \* \* \* \*

UNITED STATES PATENT AND TRADEMARK OFFICE
CERTIFICATE OF CORRECTION

PATENT NO.         : 8,155,015 B2                                    Page 1 of 1
APPLICATION NO.    : 12/079920
DATED              : April 10, 2012
INVENTOR(S)        : Alexander Maltsev et al.

It is certified that error appears in the above-identified patent and that said Letters Patent is hereby corrected as shown below:

On the title page, item (73), in column 1, in "Assignee", line 1, delete "Clar," and insert
-- Clara, --, therefor.

Signed and Sealed this
Twenty-eighth Day of August, 2012

David J. Kappos
*Director of the United States Patent and Trademark Office*